United States Patent
Wood et al.

(10) Patent No.: US 9,892,474 B2
(45) Date of Patent: Feb. 13, 2018

(54) COMPUTING SYSTEM AND METHOD FOR VISUALIZING INTEGRATED REAL ESTATE DATA

(71) Applicant: Jones Lang LaSalle IP, Inc., Chicago, IL (US)

(72) Inventors: Ryan Wood, Buford, GA (US); Daniel Fenton, Washington, DC (US); Paul Roeser, Decatur, GA (US)

(73) Assignee: JONES LANG LASALLE IP, INC., Chicago, IL (US)

( * ) Notice: Subject to any disclaimer, the term of this patent is extended or adjusted under 35 U.S.C. 154(b) by 579 days.

(21) Appl. No.: 14/516,893

(22) Filed: Oct. 17, 2014

(65) Prior Publication Data

US 2016/0110823 A1 Apr. 21, 2016

(51) Int. Cl.
*G06Q 50/16* (2012.01)

(52) U.S. Cl.
CPC ................................ *G06Q 50/163* (2013.01)

(58) Field of Classification Search
None
See application file for complete search history.

(56) References Cited

U.S. PATENT DOCUMENTS

| 6,101,534 | A | 8/2000 | Rothschild | |
|---|---|---|---|---|
| 2013/0262152 | A1* | 10/2013 | Collins | G06F 17/30312 705/4 |
| 2015/0058233 | A1* | 2/2015 | Budlong | G06Q 10/00 705/315 |

* cited by examiner

*Primary Examiner* — Edward Martello

(74) *Attorney, Agent, or Firm* — Troutman Sanders LLP

(57) ABSTRACT

A computer-implemented method and a computing system are provided for visualizing real-estate markets. The method includes obtaining property query data, locating and obtaining property data from a real estate database, locating and obtaining geospatial data associated with the one or more properties from a geographic information system (GIS) database based on the one or more criterion, correlating the property data with the geospatial data to provide correlation data, and generating visual indicators. The property query data includes data describing a request to identify one or more properties based on one or more criterion associated with the one or more properties. The property data and geospatial data are located based on the one or more criterion from the query data. The property data includes property location data and property feature data. The geospatial data includes geospatial coordinate data and geospatial image data. The visual indicators are generated based on the correlation data.

18 Claims, 16 Drawing Sheets

| Tenant | ∨ | View Records | Address | ∨ | Close |

| | |
|---|---|
| Tenant Name: | Aaron Rents |
| Industry: | Retailer/Wholesaler |
| Bldg Address: | 5003 Terminus Drive |
| Building Name: | |
| Submarket: | Airport/South I-85 |
| Landlord: | ING |
| Lease Announcement date: | 2/20/2011 |
| Prop Type: | Ind'l |
| Confidential: | ☐ |
| Full Comp: | ☑ |

| | | | |
|---|---|---|---|
| Rent: | $2.15 | Rent type: | NNN |
| SqFt: | 226,000 | Office: | 15000 |
| Escalation: | 2.00% | Dock doors: | 36 |
| Abatement: | 6 | Drive ins: | 2 |
| TI: | 3 | Clear Height: | |
| Move In Date: | 2/15/2011 | | |
| Lease Term: | 126 | | |
| Lease Type: | New | | |
| Tenant Rep Company: | Colliers | | |
| Tenant Rep Name: | Weaver/Logue | | |

604, 606, 608, 610, 602, 600

Comments: 15,000 sq ft office. Year 1 at $1.90 nnn. Landlord rep: Koening, Avison Young

FIG. 6

COMPUTING SYSTEM AND METHOD FOR VISUALIZING INTEGRATED REAL ESTATE DATA

FIELD OF THE INVENTION

The invention relates to real estate market research. More specifically, the invention relates to a computing system and method for visualizing conditions in real estate markets.

BACKGROUND

Commercial real estate customers have complex needs when looking for new properties, either as prospective investors or prospective tenants. They must consider many factors. Some factors are common to all real estate transactions: the size of the property, the floor space of the building, the price, and the location. However, commercial customers must also consider complicated factors such as proximity to infrastructure, including utilities and transport, and specific layouts within the building.

In the past, determining these factors required a physical visit to the site. However, physically visiting real estate sites can be expensive and time consuming. Thus, a need exists for a tool capable of conveying all of the same information that could be gleaned from a physical visit—along with additional information that is not available from a physical visit—in a comprehensive and user-friendly fashion.

SUMMARY

In one embodiment of the disclosure, a computer-implemented method is provided for visualizing real-estate markets. The method includes obtaining property query data, locating and obtaining property data from a real estate database, locating and obtaining geospatial data associated with the one or more properties from a geographic information system (GIS) database based on the one or more criterion, correlating the property data with the geospatial data to provide correlation data, and generating visual indicators. The property query data includes data describing a request to identify one or more properties based on one or more criterion associated with the one or more properties. The property data and geospatial data are located and obtained based on the one or more criterion from the query data. The property data includes property location data and property feature data. The geospatial data includes geospatial coordinate data and geospatial image data. The visual indicators are generated based on the correlation data.

In another exemplary embodiment, the method of generating the visual indicators includes assigning one or more geometric elements to the geospatial coordinate data within the correlation data, assigning colors to the one or more geometric elements based on the correlation data, and generating display data comprising the geometric elements superimposed on the geospatial image data.

In another exemplary embodiment the one or more geometric elements include one or more polygons. The polygons are generated based the correlation data and represent facets of a polyhedron which in turn represents features of a structure. Multiple polyhedrons and associated polygons may be generated to represent multiple structures. In one exemplary embodiment the one or more structures are buildings. In another exemplary embodiment, the features represented by the one or more polygons may be levels of the one or more structures and/or internal divisions of the one or more structures.

In another exemplary embodiment, the method also includes obtaining additional query data which designates one of the one or more structures represented by the one or more polygons and generating additional display information. This additional display information includes property feature data associated with the designated structure.

In another exemplary embodiment the visual indicators may be one or more perimeters enclosing geographic features at a particular distance, based on the query information. In one embodiment, these visual indicators may be one or more polygons. In another embodiment, these perimeter indicators may be one or more conic sections, such as circles or ellipses.

In another exemplary embodiment, a computing system is provided for visualizing real-estate markets. The computing system includes a query module configured to obtain property query data, locate property data, and locate geospatial data, a correlation module configured to correlate the property data with the geospatial data to provide correlation data, and a visual indicator module configured to generate visual indicators based on the correlation data. The correlation module is operatively connected to the query module and the visual indicator module. The property query describes a request to identify one or more properties based on criteria associated with the one or more properties. The property data includes property location data and property feature data and is obtained from a real estate database based on the one or more criterion. The geospatial data includes geospatial coordinate data and geospatial image data associated with the one or more properties and is obtained from a geographic information system (GIS) database based on the one or more criteria.

In another embodiment, the visual indicator module is configured to generate visual indicators by assigning one or more geometric elements to the geospatial coordinate data within the geographic data, assigning colors to the one or more geometric elements based on the correlation data, and generating display data which includes the geometric elements superimposed on the geospatial image data. In one embodiment, the one or more geometric elements include one or more polygons based on the geometric elements and the correlation data. In this embodiment, the one or more polygons represent facets of a polyhedron which represents features of one or more structures. In another embodiment, the one or more structures are buildings. In another exemplary embodiment, the features of the one or more structures represented by the one or more polygons include levels of the one or more structures and/or internal divisions of the one or more structures.

In another exemplary embodiment, the query module is further configured to obtain additional query data which designates one of the one or more structures and generate additional display information. This additional display information includes property feature data associated with the designated structure.

In another exemplary embodiment, the visual indicators may be one or more perimeters enclosing geographic features at a particular distance, based on the query information. In one embodiment, these visual indicators may be one or more polygons. In another embodiment, these perimeter indicators may be one or more conic sections, such as circles or ellipses.

In another exemplary embodiment a non-transitory computer-readable medium is provided which contains executable instructions, which when executed by one or more processing units cause the one or more processing units to carry out a method which includes obtaining property query data, obtaining property data from a real estate database, obtaining geospatial data associated with the property data from a geographic information system (GIS), correlating the property data with the geospatial data to provide correlation data, and generating visual indicators. The property query data includes data describing a request to identify one or more properties based on one or more criterion associated with the one or more properties. The property data and geospatial data are located based on the one or more criterion from the query data. The property data includes property location data and property feature data. The geospatial data includes geospatial coordinate data and geospatial image data. The visual indicators are generated based on the correlation data In another exemplary embodiment, the method of generating the visual indicators contained on the non-transitory computer-readable medium includes assigning one or more geometric elements to the geospatial coordinate data within the correlation data, assigning colors to the one or more geometric elements based on the correlation data, and generating display data comprising the geometric elements superimposed on the geospatial image data.

BRIEF DESCRIPTION OF THE DRAWINGS

FIG. 6 is a screenshot exemplary of a search window which can be used to obtain property query data from a user in accordance with one example of the instant disclosure.

DETAILED DESCRIPTION

To facilitate an understanding of the principals and features of the disclosed technology, illustrative embodiments are explained below. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It must also be noted that, as used in the specification and the appended claims, the singular forms "a," "an" and "the" include plural referents unless the context clearly dictates otherwise.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Figure 1:
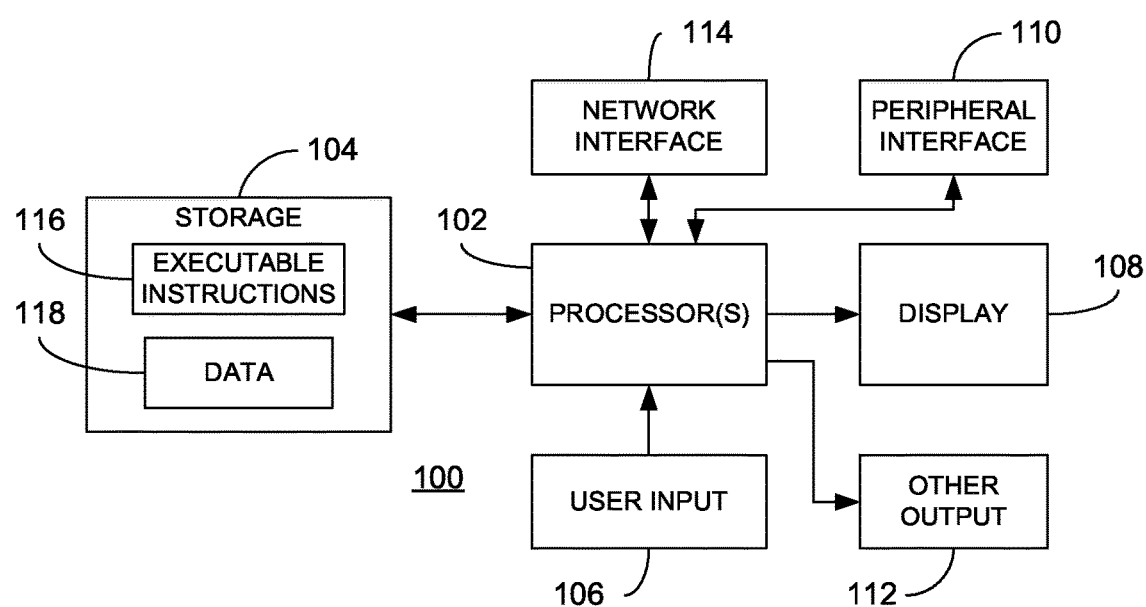
FIG. 1 is a block diagram of a computer system which can be used to implement the method or system, in accordance with one example of the instant disclosure.

Referring now to the Figures, in which like reference numerals represent like parts, various embodiments of the computing devices and methods will be disclosed in detail. FIG. 1 is a block diagram illustrating one example of a computing device 100 suitable for use in generating visualizing integrated real estate data.

FIG. 1 illustrates a representative computing device 100 that may be used to implement the teachings of the instant disclosure. The device 100 may be used to implement, for example, one or more components of the system shown in FIG. 4, as described in greater detail below. As another example, the device 100 may be used to implement the methods of FIG. 2 or FIG. 3, as described in greater detail below. The device 100 includes one or more processors 102 operatively connected to a storage component 104. The storage component 104, in turn, includes stored executable instructions 116 and data 118. In an embodiment, the processor(s) 102 may include one or more of a microprocessor, microcontroller, digital signal processor, co-processor or the like or combinations thereof capable of executing the stored instructions 116 and operating upon the stored data 118. Likewise, the storage component 104 may include one or more devices such as volatile or nonvolatile memory including but not limited to random access memory (RAM) or read only memory (ROM). Further still, the storage component 104 may be embodied in a variety of forms, such as a hard drive, optical disc drive, floppy disc drive, flash memory, etc. Processor and storage arrangements of the types illustrated in FIG. 1 are well known to those having ordinary skill in the art. In one embodiment, the processing techniques described herein are implemented as a combination of executable instructions and data within the storage component 104.

As shown, the computing device 100 may include one or more user input devices 106, a display 108, a peripheral interface 110, other output devices 112, and a network interface 114 in communication with the processor(s) 102. The user input device 106 may include any mechanism for providing user input to the processor(s) 102. For example, the user input device 106 may include a keyboard, a mouse, a touch screen, microphone and suitable voice recognition application, or any other means whereby a user of the device 100 may provide input data to the processor(s) 102. The display 108 may include any conventional display mechanism such as a cathode ray tube (CRT), flat panel display, projector, or any other display mechanism known to those having ordinary skill in the art. In an embodiment, the display 108, in conjunction with suitable stored instructions 116, may be used to implement a graphical user interface. Implementation of a graphical user interface in this manner is well known to those having ordinary skill in the art. The peripheral interface 110 may include the hardware, firmware and/or software necessary for communication with various peripheral devices, such as media drives (e.g., magnetic disk, solid state, or optical disk drives), other processing devices, or any other input source used in connection with the instant techniques. For example, the peripheral interface may be a Universal Serial Bus (USB). Likewise, the other output device(s) 112 may optionally include similar media drive mechanisms, other processing devices, or other output destinations capable of providing information to a user of the device 100, such as speakers, LEDs, tactile outputs, etc. Finally, the network interface 114 may include hardware, firmware, and/or software that allows the processor(s) 102 to communicate with other devices via wired or wireless networks, whether local or wide area, private or public, as known in the art. For example, such networks may include the World Wide Web or Internet, or private enterprise networks, as known in the art.

While the computing device 100 has been described as one form for implementing the techniques described herein, those having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations of the device 100 may include a greater or lesser number of components than those illustrated. Once again, those of ordinary skill in the art will appreciate the wide number of variations that may be used is this manner. Further still, although a single computing device 100 is illustrated in FIG. 1, it is understood that a combination of such computing devices may be configured to operate in conjunction (for example, using known networking techniques) to implement the teachings of the instant disclosure.

Figure 2:
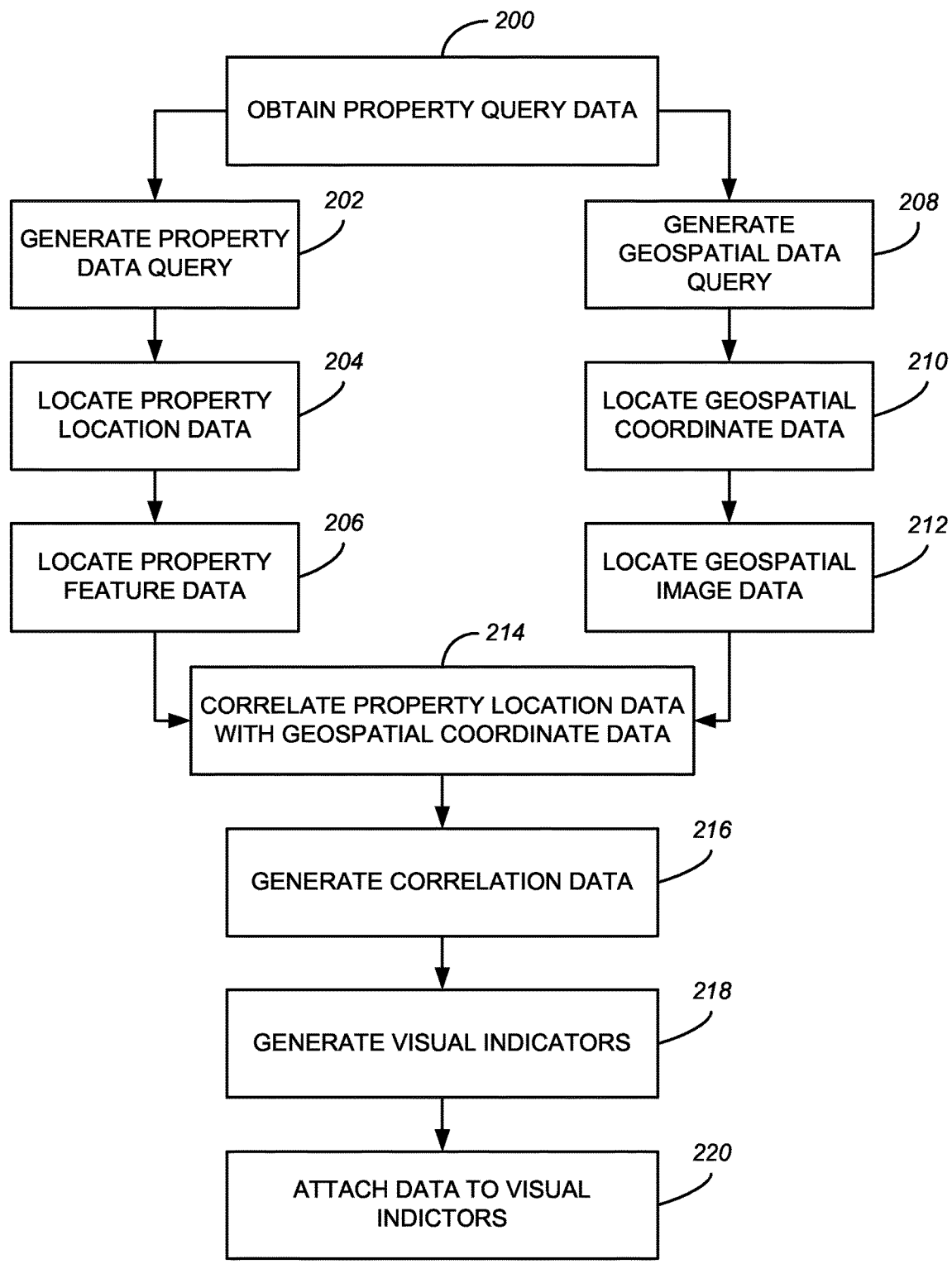
FIG. 2 is a flow chart illustrating exemplary steps of a method for visualizing real-estate markets in accordance with one example of the instant disclosure.

FIG. 2 is a flow chart illustrating the steps in the basic method for visualizing real-estate markets. At 200 property query data is obtained. In one embodiment, the property query data may be obtained from a user via one or more input-output (I/O) devices. Examples of I/O devices include but are not limited to: a keyboard, a computer mouse, a display, a touchscreen, or a microphone with speech-recognition software. In another embodiment, the query data may be obtained from a computing device, for example a mobile phone, desktop or notebook computer, or a server. In another embodiment, the property query data may be obtained from a user through a computerized intermediary.

The query data includes desirable characteristics of real-estate properties. These characteristics may include, by way of example and not limitation: the current tenant, the address, the type of building (e.g., residential, commercial, or industrial), the geographic market, the rent, the available space, the rent terms, and the move-in date.

At 202, one or more property data queries are generated based on the query data. Multiple property data queries may be generated if the required property location data is obtained from multiple databases. The one or more database queries are generated utilizing the proper programming syntax or syntaxes to locate property location data and property feature data in the one or more databases. The one or more databases may be propriety, public, or both.

At 204, property location data is located within one or more databases utilizing the one or more database queries generated at 202. Property location data includes one or more points locating the property, its boundaries, and/or its feature on Earth. The property location data may be address data, tax identification number, parcel identification number, survey data, a latitude and a longitude, a metes and bounds description, a reference to the Government Survey System of principal meridians and baseline, or Global Positioning System (GPS) coordinates, etc.

At 206, property feature data is located within one or more databases utilizing the one or more database queries generated at 202. Examples of property feature data includes, without limitation: improvements to the property, roads, utility services, and proximity to transportation infrastructure. As will be understood by a person having ordinary skill in the art, improvements are man-made features on the property such as buildings, sheds, driveways, etc.

At 208, one or more geospatial data queries are generated based on the query data. Multiple geospatial data queries may be generated if the required geospatial location data is obtained from multiple databases. The one or more database queries are generated utilizing the proper programming syntax or syntaxes to locate geospatial coordinate data and geospatial image data in the one or more databases. The one or more databases may be propriety, public, or both.

At 210, geospatial coordinate data is located within one or more databases utilizing the one or more database queries generated at 202. Geospatial coordinate data includes a plurality of points and/or vectors for associating geospatial image data with various viewing perspectives. The geospatial coordinate data may be represented in Cartesian, cylindrical, or polar coordinates, a latitude and longitude, or GPS data.

At 212, geospatial image data is located within one or more databases utilizing the one or more database queries generated at 202. Geospatial image data includes models, renderings, or photographs representing actual natural and man-made features at particular locations on Earth.

At 214, property location data is correlated with geospatial coordinate data. Although the property location data and geospatial location data may be in different formats, the method interprets them such that they can be coordinated. For example, property location data may include addresses for one or more properties of interest and geospatial coordinate data may include corresponding Global Positioning System (GPS) coordinates for the same location. In this example, the addresses and GPS coordinates are correlated at step 214.

At 216, the property feature data associated with that property location data (e.g., addresses) and geospatial image data associated with that geospatial coordinate data (e.g., GPS coordinates) are also correlated. Thus, new correlation data is generated, consisting of a single correlated data entry for each property of interest. Each correlated data entry includes the property location data (addresses), geospatial coordinate data (GPS coordinates), property feature data, and the geospatial image data associated with that property.

At 218, the correlation data is used to generate visual indicators associated with the properties of interest. The visual indicators may include polygons and/or polyhedrons, perimeters, radii, point, and "popups." Popups are subwindows or new windows which display additional data. The visual indicators may be generated using Geography Markup Language (GML), Keyhole Markup Language (KML), or another alternative software tool, as will be understood by one having ordinary skill in the art.

In one exemplary embodiment, the visual resolution of the visual indicators may be reduced, such that the visual indicators may have lower resolution than the display is capable of and/or lower resolution than the source can render. This embodiment may be selected, for example, to improve the speed with which users can access and visualize the integrated real estate data. In another exemplary embodiment, the resolution of the geospatial image data may also be reduced to improve the speed with which users can access and visualize the integrated real estate data.

At 220, additional property feature data is attached to the visual indicators. The type of property feature data may depend on the type of visual indicator. For example, a building's size, its available space, its address, and a photo of the building may be attached to a polygon visual indicator. In addition, the attached property feature data may be displayed as another type of visual indicator. For example, clicking on a polygon visual indicator may cause the attached building data to be displayed within a popup visual indicator. Types of visual indicators are discussed in greater detail below. As will be understood by one having ordinary skill in the art, the sequence of steps may be different in some embodiments of the disclosure.

In one embodiment, the property feature data may be attached to the visual indicators using a separate Data Authoring Tool (DAT). In this embodiment, the DAT modifies existing visual indicators by adding information converted from another source. For example, the DAT may convert comma-separated values from a .csv file to GML or KML output and insert the GML or KML output into one or more existing GML or KML files containing the code for existing visual indicators.

Figure 17:
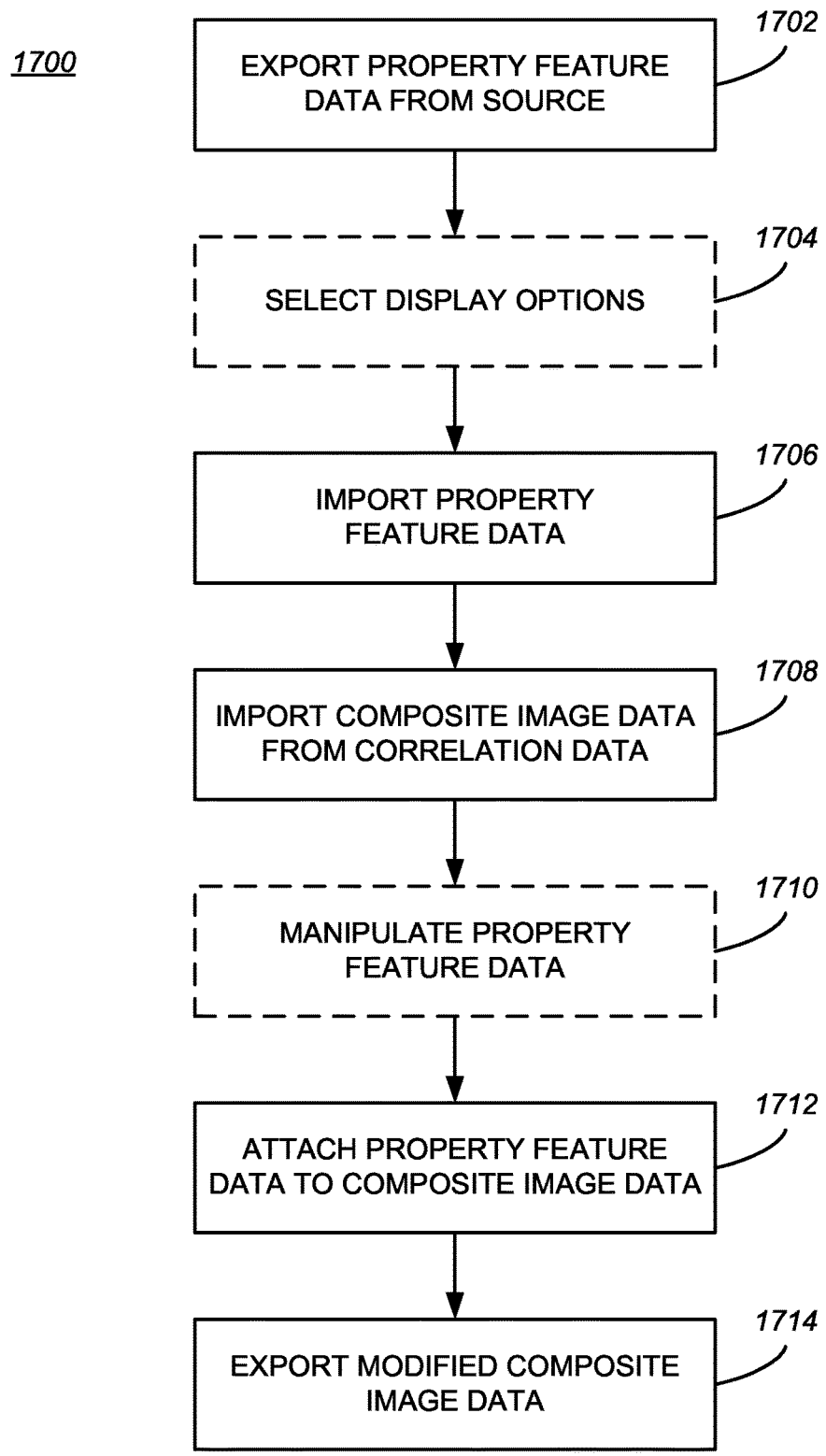
FIG. 17 is a flow chart illustrating an exemplary method for using one embodiment of a Data Authoring Tool.

FIG. 17 is a flow chart illustrating the steps 1700 in one embodiment of the DAT. At 1702 property feature data is exported from one or more sources. The property feature data may, for example, be exported as a comma-separated value (.csv) file, a spreadsheet file, or in a proprietary file format. At 1704 the DAT may optionally provide the user with options for how to view the exported property feature data. For example, the user may be able to view a grid or table of the data, to view a map containing the raw data, or view a preview of GML or KML data. Changing how the data is viewed may also affect the final composite image data. For example, the fields or entries may be reordered, changing the position of the textual information in a popup visual indicator or changing the priority of a search category. The character of data fields may also be changed. For example, a data field may be changed from a text string to a numerical value, enabling numerical searches for that field. Instead of manually changing the format of the data, the system may alternately allow a user to select from a number of predefined or customized templates.

At 1706, the property feature data exported from the one or more sources is imported into the DAT to be manipulated. The DAT may also check that mandatory fields, such as a property ID, are present. At 1708 composite image data is imported from the correlation data.

At 1710 the user may manipulate the property feature data. The user may edit or delete individual values within an entry. The user may also edit, sort, filter, or delete classes or categories of data. The user may also manually add classes or categories of data or manually add individual entries or values of data. For example, a user may add a field for visual data and then upload photographs of particular properties. Alternately, the user may link to a preexisting photo of the property from the entry for a different space within the same building. The user may also assign visual indicator colors for certain values within categories. For example, the user may assign a first color for available properties, a second color for unavailable properties, and a third color for properties about to become available. The user may also define mathematical models for formatting the visual indicators. For example, the user may assign colors to visual indicators based on a linear distribution of numerical values, based on a normal distribution of numerical values, quartiles/quintiles, etc.

The user may also manually manipulate which values, entries, classes, or categories of data will be displayed in the final composite image data. Manipulating the data to be displayed can be performed by toggling values for display rules. For example, data may be completely hidden, always displayed, only displayed when a popup is activated, or only displayed for certain types of users. To facilitate editing such a large quantity of data, the DAT may highlight entries, categories, or individual values that have been edited. Similarly, the DAT may include tools to edit entire categories. For example, a user may click a box at the bottom of a column in the grid view to select and edit all value for that data category. A person having ordinary skill in the art will understand that many variations of display rules may be generated.

At 1712 the imported property feature data, including any applicable changes or manipulations, is attached to the composite image data. Property feature data is attached by adding or modifying the KML or GML code representing the composite image data. More specifically, the property feature data is attached to specific visual indicators within the composite image data. For example, selected values from a property feature data entry may be merged into the GML code for a polygon representing a particular office building. The modified GML code may include rules to change the color of the polygon depending on the terms of a search and to display a popup with selected information when a certain class of user clicks on the polygon. The DAT may also check the modified code for accuracy and completeness. For example, it may ensure that the syntax of the code is valid or it may ensure that every property has at least one visual indicator assigned to it. A person skilled in the art will understand that there may be many permutations and that other programming languages aside from GML and KML may be used to achieve these results.

Figure 3:
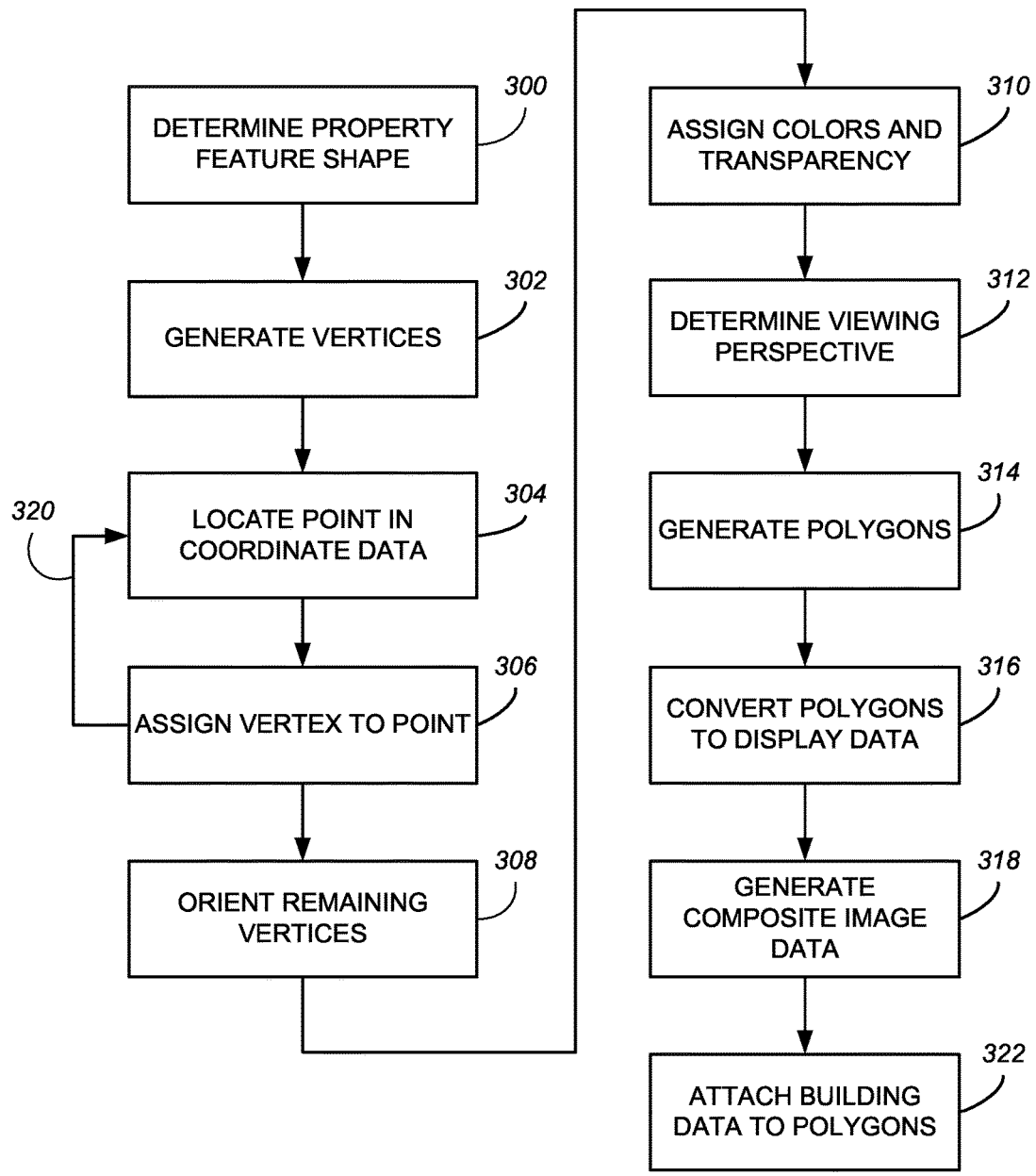
FIG. 3 is a flow chart illustrating exemplary steps of a method for generating visual indicators in accordance with one example of the instant disclosure.

FIG. 3 is a flow chart illustrating the steps in one exemplary method for generating visual indicators. At 300, the property feature data is analyzed to determine the shape of each property feature. The shape may include one or more polyhedrons. For example, a property feature may be a house. If the house has a simple rectangular foundation and a pitched roof, the shape of the property feature might include a rectangular polyhedron (an irregular hexahedron) to represent the occupied above-ground floors and a triangular polyhedron (an irregular pentahedron) stacked on top of it to represent the roofline. Similarly, a single-story structure with a complicated layout and a flat roof might be represented by a group of adjoining rectangular polyhedrons. In this manner, a vast array of complicated property features can be modeled as a collection of intimately connected polyhedrons.

Alternately, a property feature may be flat. For example, a property feature may be a road. The surface of the road is essentially flat (neglecting the curvature of the Earth). Therefore, this type of feature is more appropriately represented by two-dimensional geometric figures. Thus, the surface of the road may be represented by one or more adjoining polygons. Similarly, a property feature may be a proximity to something else. For example, a visual indicator may represent a radius of five miles from a particular property. Instead of a polygon, this property feature would be represented by a circle when the viewing perspective is directly above the property. When the viewing perspective is not directly above the property, the feature would be represented as an ellipse.

At 302, the one or more polyhedrons and polygons from step 300 are reduced to a cluster of vertices. The vertices are represented in a feature coordinate system. The feature coordinate system may be Cartesian, cylindrical, or polar. The vertices represent the corners of the polyhedrons and polygons from step 300.

At 304, a point is located in the correlation data corresponding to one of the vertices generated at 302. The geospatial coordinate data may be represented in Cartesian, cylindrical, or polar coordinates. At 306, the vertex is assigned to the geospatial coordinate point. If additional vertices can be assigned to points in the coordinate system, the process is repeated 320 until all assignable vertices have been assigned.

If more than one vertex has been assigned in the coordinate system, the cluster of vertices will be inherently aligned in the proper three-dimensional orientation within the geospatial coordinate system. If only one vertex has been assigned, the cluster of vertices representing the property feature must be oriented in the geospatial coordinate system, because only one vertex (corner) of the feature is located.

At step 308, the three-dimensional orientation of the property feature is translated into the geospatial coordinate system. This is based on the property feature data and/or the property location data. For example, a plat of survey (i.e., a surveyor's map) for a property feature may have a single point identified by a latitude and longitude, by a metes and bounds description, or by reference to the Government Survey System of principal meridians and baselines. However, the plat will also indicate a cardinal direction (usually North). By interpreting the cardinal direction on the plat, the location of the remaining vertices of the property feature can be oriented in the three-dimensional geospatial coordinate system. If the sole vertex is represented only by a latitude and longitude, the altitude may be presumed to match the known altitude of that location within the geospatial coordinate data. With the three-dimension location of the known vertex determined, the orientation of the remaining vertices can be determined with the cardinal-direction data and the presumption that the cardinal-direction vector is tangential to the surface of the planet at that location.

At 310, colors and transparency are assigned to the shapes (e.g. polyhedrons, polygons, circles, etc.) representing the property feature. For example, a simple representation of a building available for rent might be an opaque green polyhedron. If only a portion of the building is available, the representation might be adjoining green and red polyhedrons, the green representing the portion of the building available for rent and the red representing the occupied portion. If additional information is available about the property feature, some facets of the polyhedron might be partially transparent. For example, if an internal floor plan of a building ready to rent is available, the outer facets of the polyhedron or polyhedrons representing the external surface of the building might be green and partially transparent. Conversely, internal walls of the building, derived from the floor plan, might be represented by tall, thin, opaque green polyhedrons. This creates the impression of looking "through" the walls of a building to see the three-dimensional internal layout in a color representing the status of the rentable spaces. In one embodiment, the colors and transparency may be assigned using the DAT.

At 312, the perspective from which the property feature is viewed is determined. For example, if the property feature is viewed from the street, this perspective would be tangential to the surface of the Earth at that location, and appropriately oriented relative the known orientation of the street. Alternately, if the viewing perspective is airborne, for example a satellite image or a theoretical airplane's view, this will be based on a known point and orientation vector within the geospatial coordinate system.

At 314, the known locations of the property feature vertices, the color and transparency of the polyhedrons, and the viewing perspective (location and unit vector) are used to generate theoretical two-dimensional figures representing the visible facets of the property feature. The two dimensional figures are polygons and/or conic sections. Conic sections are used to represent circular visual indicators viewed from an angle. Polygons are used to represent the remaining visual indicators. The polygons are generated based on the polyhedrons using geometric transformations known to those skilled in the art. At 316, the theoretical two-dimensional figures are converted into display data. The display data includes specific graphic vectors or pixel data which, when interpreted by a computing device, will render the generated polygons and conic sections.

At 318, a composite display image is generated. The composite display image includes the generated two-dimensional figures superimposed on geospatial image data. For example, a rectangular building available for rent (i.e., a property feature) would be represented as one or more green trapezoids. In this example, the shape and size of the trapezoids would be determined by the viewing perspective relative to the location of the building. At 322, additional building data is attached to the polygons in the generated composite display image. For example, additional building data may include the building's size, available space, address, and photograph. Additionally, this additional building data may be displayed within a popup visual indicator. Such a popup may be triggered by clicking on the polygons to which the additional building data is attached, by hovering over the polygons with a cursor, or by other conventional indicating means, as will be understood by those having ordinary skill in the art.

Figure 4:
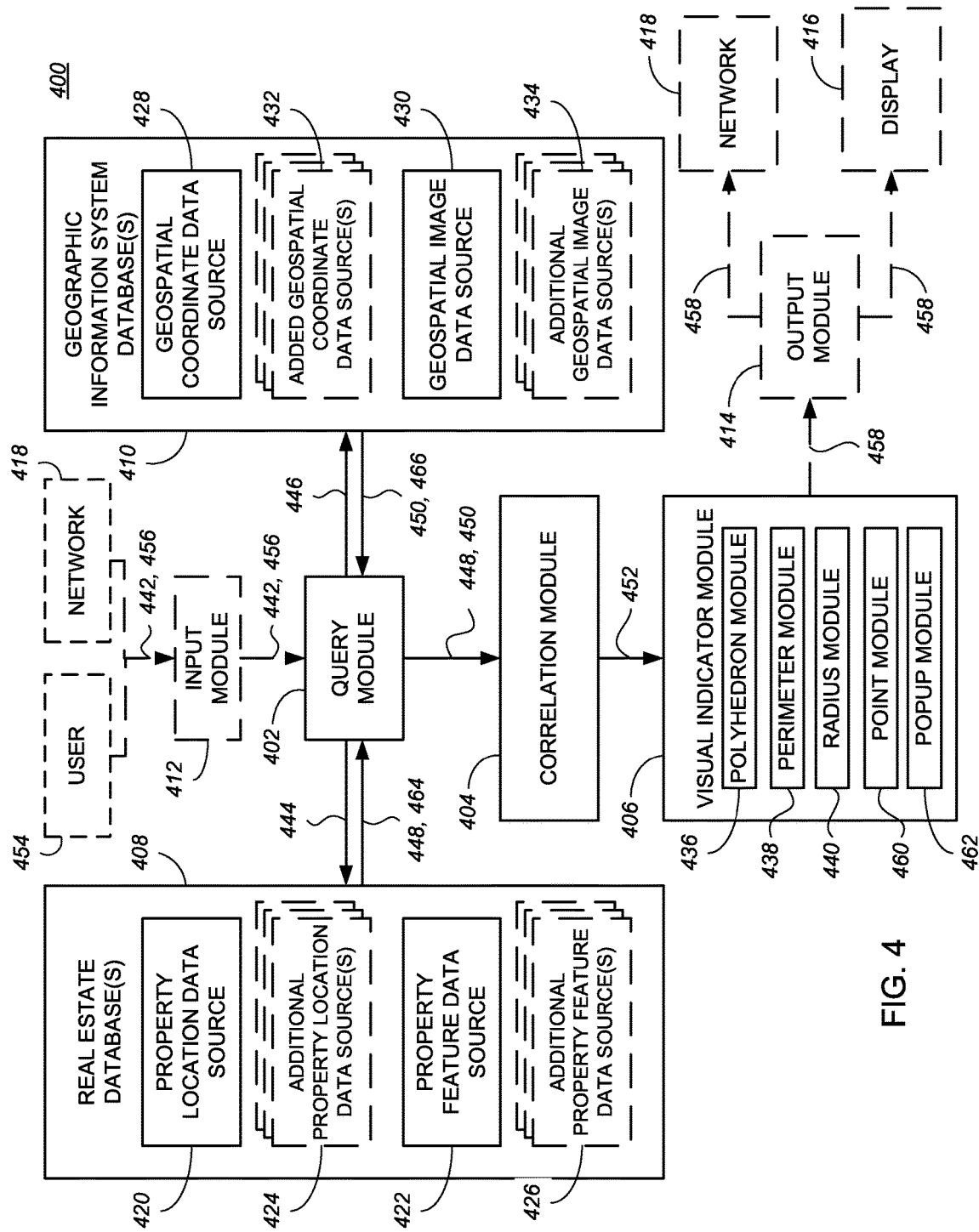
FIG. 4 is block diagram illustrating an exemplary system for visualizing real estate markets in accordance with one example of the instant disclosure.

FIG. 4 is a block-diagram illustrating one embodiment of the disclosure, comprising a system 400 for visualizing real estate markets. The system 400 includes a query module 402, a correlation module 404, and a visual indicator module 406. The query module 402 is operatively connected to real estate databases 408 and geographic information system databases 410. In some embodiments, the system 400 may further include an input module 412, an output module 414, a display module 416, and/or a communications network 418. The real estate databases 408 and the geographic information system databases 410 are operatively connected to the query module 402. The query module 402 is operatively connected to the correlation module 404. The correlation module 404 is operatively connected to the visual indicator module 406.

The real estate databases 408 include at least one property location data source 420 and at least one property feature data source 422. Both the property location data source(s) 420 and the property feature data source(s) 422 may be real estate databases. In some embodiments, there may be one or more additional property location data sources 424 and/or one or more additional property feature data sources 426. These may be additional real estate databases, or another type of public or private database. The geographic information system databases 410 include at least one geospatial coordinate data source 428 and at least one geospatial image data source 430. In some embodiments, there may be one or more additional geospatial coordinate data sources 432 and/or one or more additional geospatial image data sources 434. The visual indicator module 406 further includes a polyhedron module 436, a perimeter module 438, a radius module 440, a point module 460, and a popup module 462.

The query module 402 is configured to obtain query data 442. The query data 442 includes one or more criteria for selecting real properties to rent or purchase. The criteria may include, for example: price, size, availability, property type, municipality, tax rates, and proximity to certain amenities or infrastructure. The query module is configured to generate one or more property data queries 444 and one or more geospatial data queries 446. One property data query 444 is formatted based on the requirements of the property location data source 420 and the property feature data source 422. Any additional property data queries 444 are formatted based on the requirements of the additional property location data sources 424 and the additional property feature data sources 426. One geospatial data query 446 is formatted based on the requirements of the geospatial coordinate data source 428 and the geospatial image data source 430. Any additional geospatial data queries 446 are formatted based on the requirements of the additional geospatial coordinate data sources 432 and the additional geospatial image data sources 434.

The property location data sources 420, 424 are configured to return property data 448 to the query module 402 and the property feature data sources 422, 426 are configured to return property feature data 464 to the module 402. The geospatial coordinate data sources 428, 432 are configured to return geospatial coordinate data 450 to the query module 402 and the geospatial image sources 430, 434 are configured to return geospatial image data 466 to the query module 402. The query module 402 is configured to transmit the data to the correlation module 404.

The correlation module 404 is configured to locate points in the geospatial coordinate data 450 which correspond to points in the property location data 444. The geospatial coordinate data 450 may be represented in Cartesian, cylindrical, or polar coordinates, a latitude and longitude, or GPS data. The property locations data 444 may be tax identification numbers, parcel identification numbers, address data, survey data, a latitude and a longitude, a metes and bounds description, or a reference to the Government Survey System of principal meridians and baselines. The correlation module 404 is further configured to generate correlation data 452. The correlation data 452 includes a list of correlated points in the geospatial coordinate data 450 and the associated property location data 444 and the property feature data 464 and geospatial image data 466 associated with those points. The correlation module 404 is configured to transmit the correlation data 452 to the visual indicator module 406.

The visual indicator module 406 is configured to obtain correlation data 452 from the correlation module 404 and generate visual indicators based on the correlation data 452. The visual indicators graphically display information about the property feature data 464. The visual indicators are superimposed on the geospatial image data 466 by the visual indicator module 406. This allows for the graphical display of the property feature data 464 to be viewed in the context of the surrounding area. The visual indicators may include polyhedrons, perimeters, radii, points, and popups. The visual indicator module 406 is configured to determine the appropriate shape for the property feature to be displayed. The polyhedron module 436, the perimeter module 438, the radius module 440 respectively, the point module 460, and the popup module 462 are configured to generate these visual indicators.

The polyhedron module 436 is configured to generate a representation of a three-dimensional property feature. The representation may include one or more polyhedrons. The polyhedrons may have a specific color or transparency to highlight specific feature about the property. The representation is tied to one or more points in the correlation data 452. The polyhedron module 436 is configured to generate a plurality of adjoining polygons which represent the visible facets of the one or more polyhedrons when viewed from a given viewing perspective. The closest facets of the polyhedron may be partially or completely transparent, allowing the facets behind them to become visible. In some embodiments, the viewing perspective 456 may be determined by a user 454. For example, the user may click on the composite image to indicate a position from which to view the composite image. Additionally, the user may drag, pan, zoom in, zoom out, or select a view from street level, as will be understood by a person having ordinary skill in the art.

The perimeter module 438 is configured to generate a three-dimensional representation of a flat property feature. The representation may include one or more perimeters surrounding a property feature at a given distance and the surface characteristics within that perimeter. The perimeter may have a specific color or transparency to highlight one or more specific features about the property. For example, representation may depict a blue perimeter five miles inland from the shore of a lake. For another example, the representation may depict a red perimeter ten miles from a major highway. The perimeter module 438 generates these representations as a plurality of adjoining polygons, superimposed on geospatial image data corresponding to the appropriate points in the correlation data. In some embodiments, the perimeter may be coincident with the edge of the feature, e.g., a zero-distance perimeter to represent a road itself.

The radius module 440 is configured to generate an alternate three-dimensional representation of a flat property feature. The representation includes one or more circular elements surrounding a property feature at a given radius. The circle may have a specific color and/or transparency to highlight one or more specific features about the property. For example, the representation may depict a semi-transparent green circle with a radius of twenty-five miles around an airport. The radius module 440 generates these representations as filled conic sections, superimposed on geospatial image data corresponding to the appropriate points in the correlation data and the viewing perspective.

In one embodiment, the system 400 may also include an input module 412. The input module 412 is operatively connected to the query module 402 and is configured to obtain data from a user 454 or a network 418. The user data may include query data 442 and/or viewing perspective data 456.

In another embodiment, the system 400 may also include an output module 414. The output module 414 is operatively connected to visual indicator module 406 and is configured to distribute visual indicator data 458. In one embodiment, the output module 414 may distribute visual indicator data 458 to a display 416. In another embodiment, the output module 414 may distribute visual indicator data 458 to a network 418.

Figure 5A:
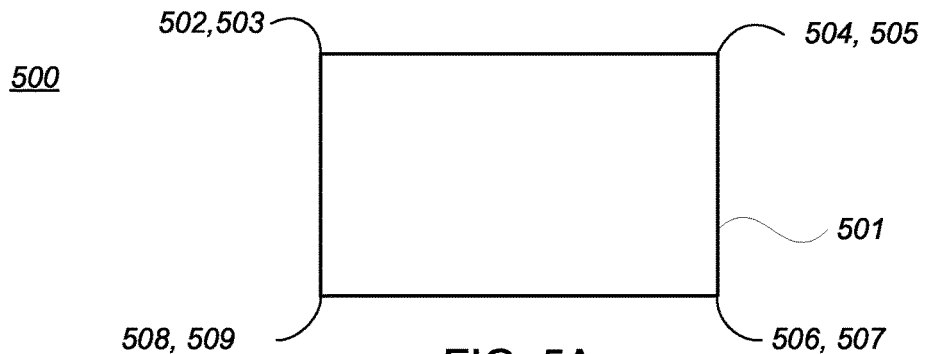
FIG. 5A is an overhead view exemplary of a visual indicator representing a rectangular structure in accordance with one example of the instant disclosure.
Figure 5B:
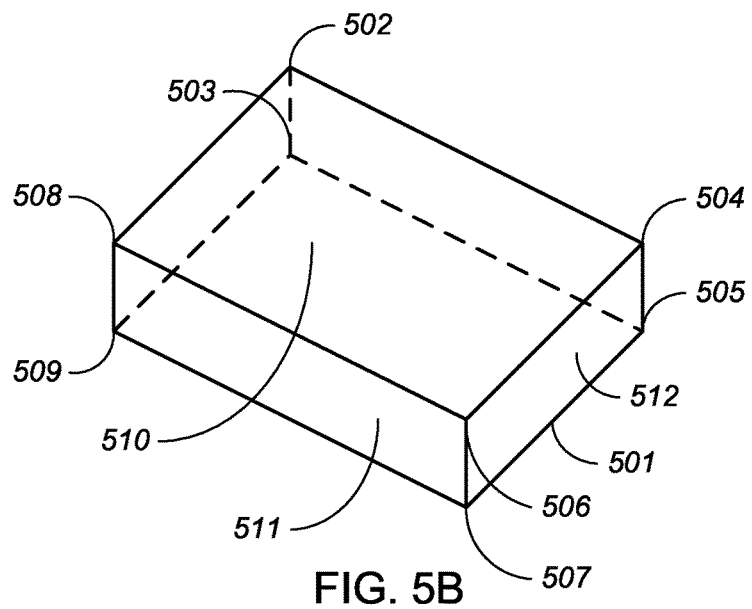
FIG. 5B is an isometric view exemplary of a visual indicator representing a rectangular structure in accordance with one example of the instant disclosure.
Figure 5C:
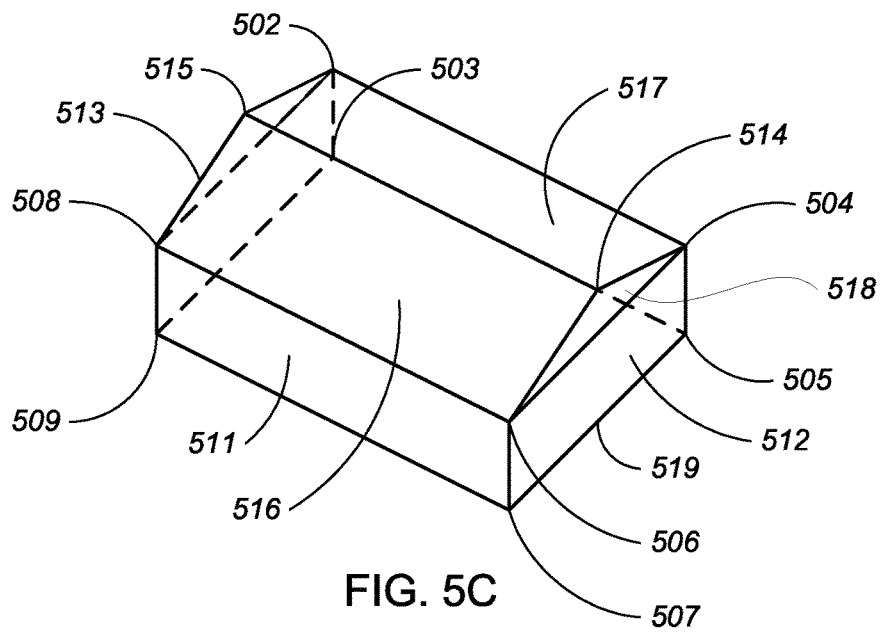
FIG. 5C is an isometric view exemplary of a visual indicator representing a rectangular structure with a pitched roof in accordance with one example of the instant disclosure.

FIG. 5A depicts one orientation of a visual indicator for a property feature. In this case, visual indicator represents a rectangular structure 500. The viewing perspective is directly overhead. The visual indicator from this viewing perspective is represented by a single rectangular polyhedron 501, represented by eight vertices: northwest top 502, northwest bottom 503, northeast top 504, northeast bottom 505, southeast top 506, southeast bottom 507, southwest top 508, and southwest 509. FIG. 5B depicts another orientation of the single rectangular polyhedron 501 representing the rectangular structure. The top facet 510, south facet 511, and east facet 512 are translucent allowing aspects of the otherwise hidden facets to be seen. These facets are represented by quadrilateral polygons defined by the vertices 502, 504, 506, and 508; 5067, 507, 508, and 509; and 504, 505, 506, and 507, respectively. FIG. 5C depicts a visual indicator representing a structure 516 having a pitched roof and a rectangular base with the same dimensions as the rectangular structure 501. The representation includes a singular rectangular polyhedron 501 and an adjoining triangular polyhedron 513 (a pentahedron). The northwest top 502, northeast top 504, southeast top 506, and southwest top 508 vertices of the rectangular polyhedron 501 are coincident with the northwest bottom, northeast bottom, southeast bottom, and southwest bottom vertices of the triangular polyhedron 513. The triangular polyhedron is further represented by an east top vertex 514 and a west top vertex 515. The top-south facet 516, top-north facet 517, and the east facet 518 of the triangular polyhedron are similarly translucent to allow aspects of otherwise hidden facets to be seen. These facets are represented by the quadrilateral polygon defined by the vertices 508, 508, 514, and 515; the quadrilateral polygon defined by the vertices 502, 504, 514, and 515; and the triangular polygon defined by the vertices 504, 506, and 514, respectively. As will be understood by a person having ordinary skill in the art polyhedrons with different facets can be arranged in other orientations to describe more complicated structures.

FIG. 6 depicts a graphical user interface (GUI) search window 600 which can be used, in one embodiment, to obtain property query data from a user. In this embodiment, the window 600 includes a plurality of text fields 602 for query parameters. The query parameters may include, for example, rent 604, size (in square feet or square meters) 606, availability date 608, and others, as shown.

Figure 7:
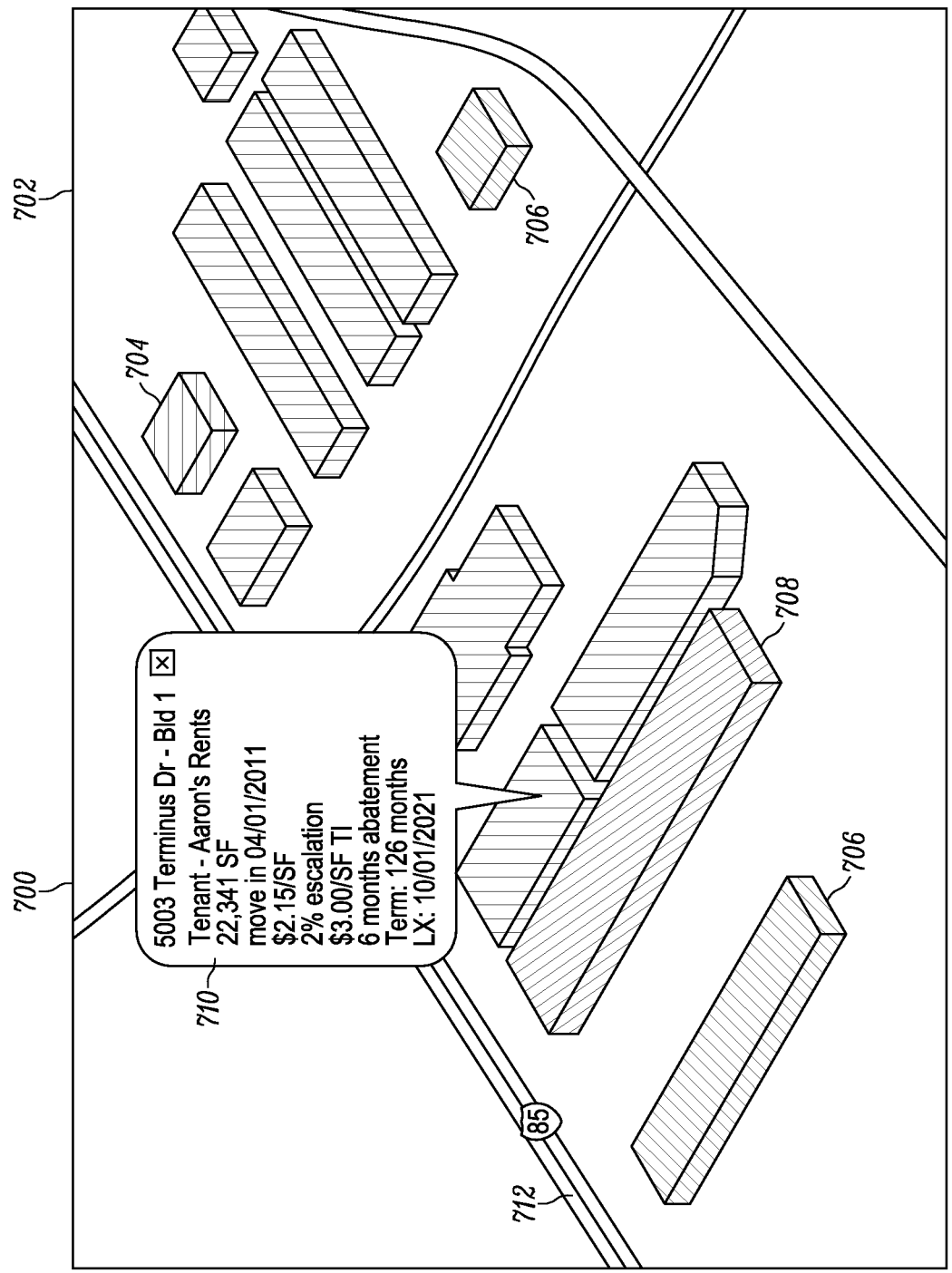
FIG. 7 is a screenshot illustrating polyhedron and perimeter-type visual indicators superimposed on geospatial image data in accordance with one example of the instant disclosure.

FIG. 7 depicts a composite display image 700. The composite display image includes geospatial image data 702 and visual indicators 704-712 superimposed on the geospatial image data 702. The visual indicators include polygons in a first color 704 representing a space currently available for rent, polygons in a second color 706 representing a plurality of spaces not currently available for rent, and polygons in a third color 708 representing a currently-occupied space which will be available for rent soon. The composite display image 702 also includes a popup visual indicator 710, which contains more detailed textual information about a selected property. Finally, the composite display image 702 also includes visual indicators highlighting flat property features, in this case roads 712.

Figure 8:
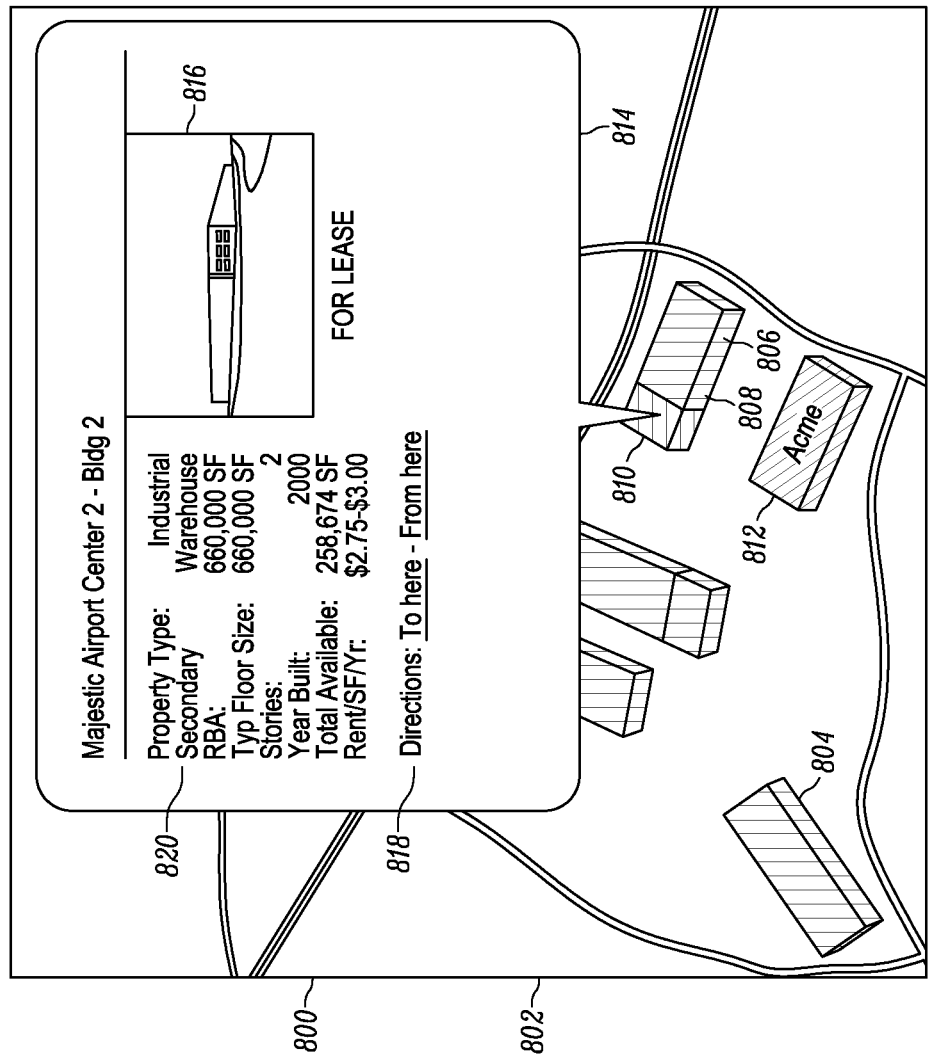
FIG. 8 is a screenshot illustrating polyhedron, popup, and perimeter-type visual indicators superimposed on geospatial image data in accordance with one example of the instant disclosure.

FIG. 8 depicts another composite display image 800. The composite display image 800 includes geospatial image data 802 and visual indicators 804-820. The visual indicators 804-820 include polygons in a first color 810 representing a space currently available for rent, polygons in a second color 804, 808 representing a plurality of spaces not currently available for rent, and a popup visual indicator 814. In this example one of the properties represented 806 is partially available. The available portion is represented by a polygon in a first color 810 and the unavailable portion is represented by a polygon in a second color 808. The a popup visual indicator 814 includes textual details 820 about the selected property, hyperlinks 818, and additional geospatial image data 816, in this case a street-level image of the property. Finally, the composite display image 800 also includes a visual indicator specifically identifying a tenant or owner 812.

Figure 9:
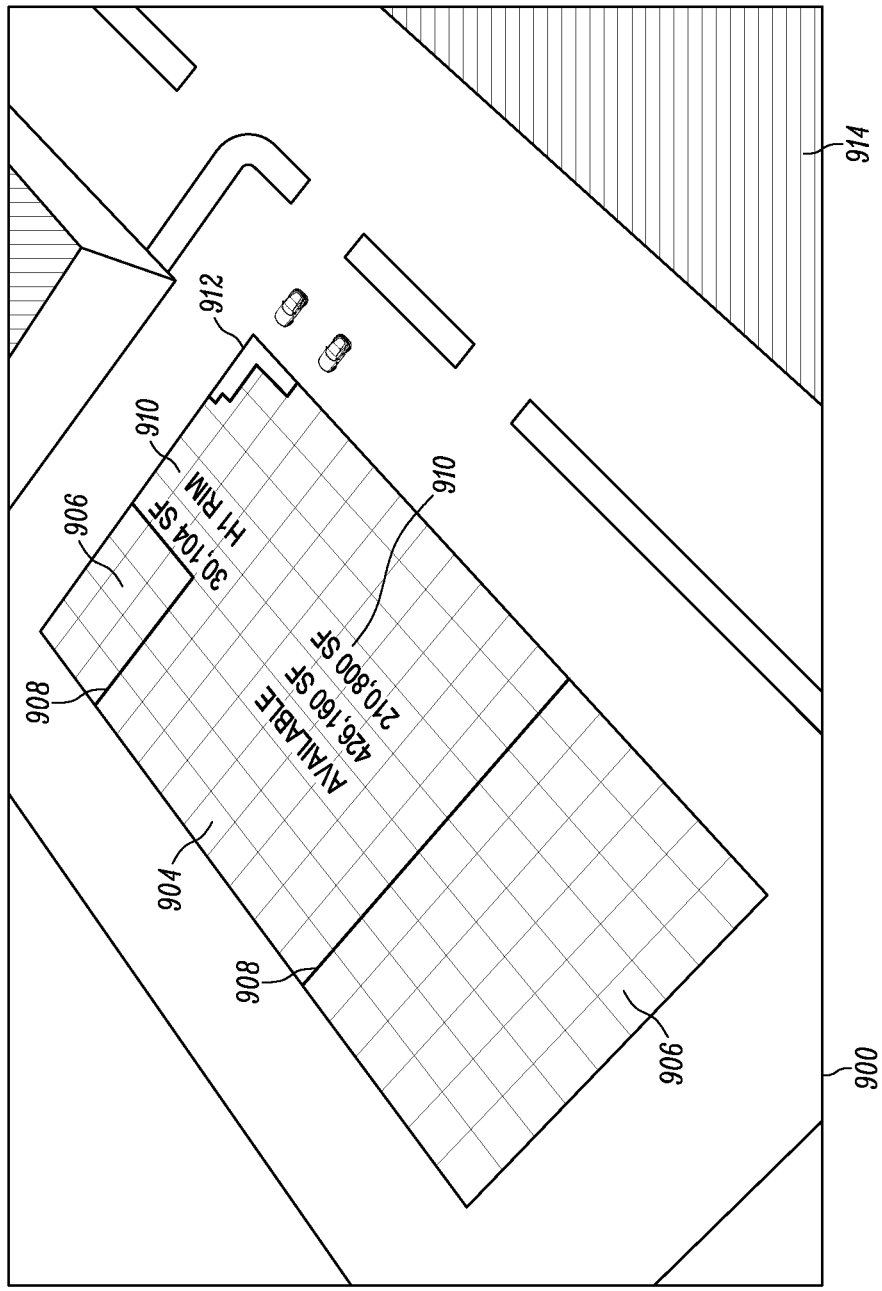
FIG. 9 is a screenshot illustrating exemplary transparent visual indicators, floorplan visual indicators, and text in accordance with one example of the instant disclosure.

FIG. 9 depicts another example of a composite display image 900, including visual indicators 902-912 superimposed on geospatial image data 914. In this example, some of the polygons representing the roof and walls of the structure 902 are completely transparent, revealing a polygon representing the footprint of the structure 912. The footprint of the structure 912 is further divided into visual indicators representing an available space 904 and unavailable spaces 906 within the structure 902. Additional visual indicators include polygons representing three-dimensional portrayals of internal walls 908 dividing the available space 904 and the unavailable spaces 906. The composite display image also includes text 910 indicating the relative sizes of the spaces in terms of floorspace.

Figure 10A:
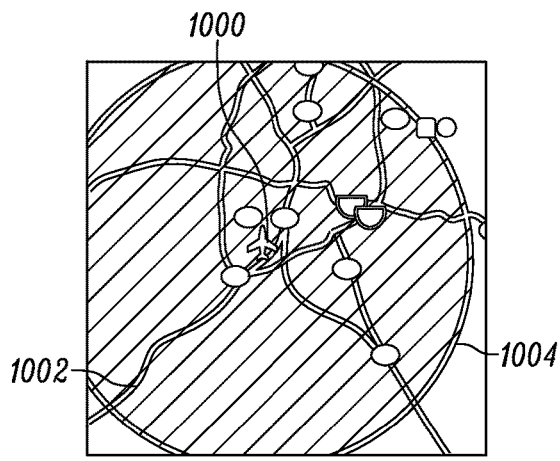
FIG. 10A is an exemplary screenshot illustrating a point visual indicator for an airport, a radius visual indicator associated with the point visual indicator, and perimeter visual indicators representing roads, in accordance with one example of the instant disclosure.
Figure 10B:
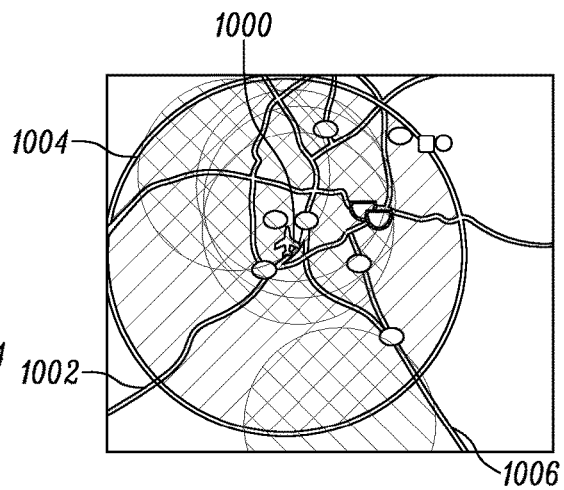
FIG. 10B is an exemplary screenshot illustrating a point visual indicator for an airport, a radius visual indicator associated with the point visual indicator, exclusion-zone radius visual indicators, and perimeter visual indicators representing roads in accordance with one example of the instant disclosure.
Figure 10C:
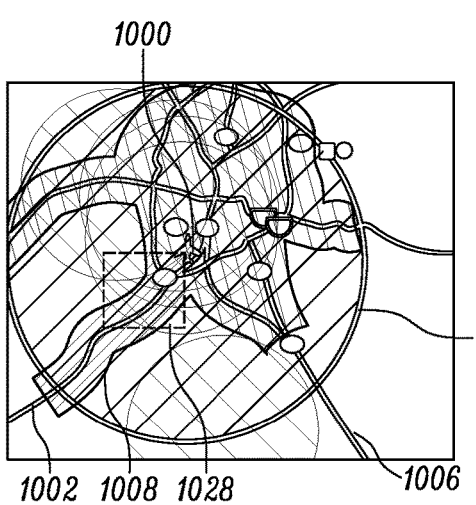
FIG. 10C is an exemplary screenshot illustrating a point visual indicator for an airport, a radius visual indicator associated with the point visual indicator, exclusion-zone radius visual indicators, and perimeter visual indicators representing roads and areas surrounding them, in accordance with one example of the instant disclosure.
Figure 10D:
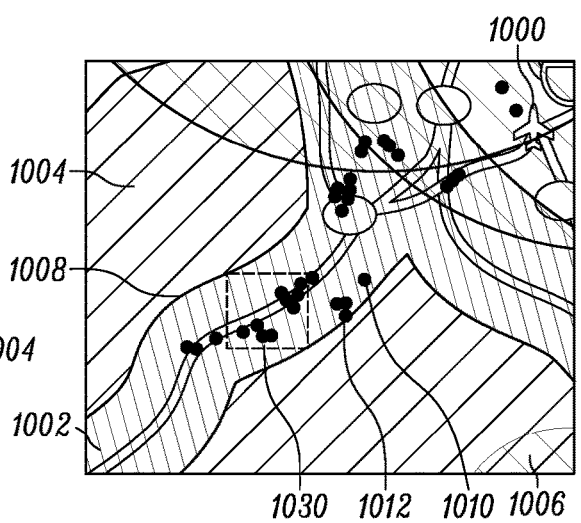
FIG. 10D is an exemplary screenshot illustrating multiple point visual indicators, exclusion-zone radius visual indicators, and perimeter visual indicators representing roads and areas surrounding them, in accordance with one example of the instant disclosure.
Figure 10E:
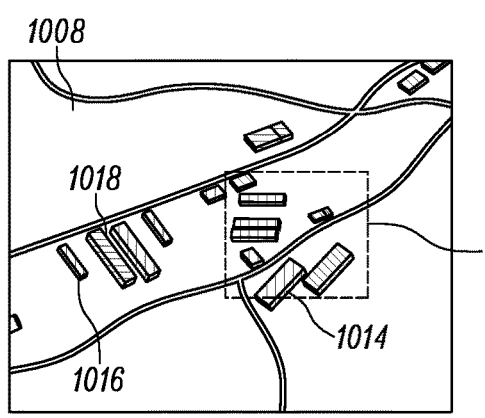
FIG. 10E is an exemplary screenshot illustrating multiple polyhedron visual indicators (representing buildings) and multiple perimeter visual indicators (representing roads), in accordance with one example of the instant disclosure.
Figure 10F:
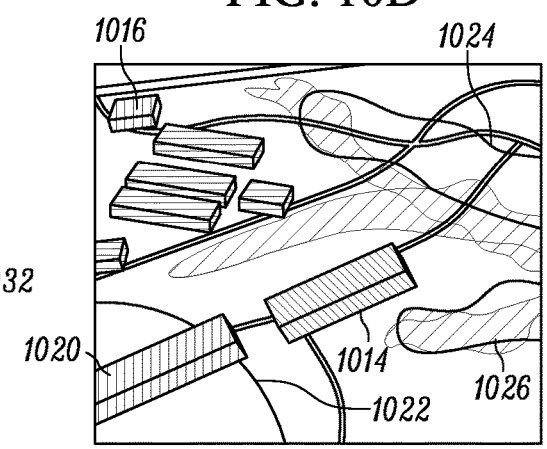
FIG. 10F is an exemplary screenshot illustrating multiple polyhedron visual indicators (representing buildings), and multiple perimeter visual indicators (representing roads and flood plains), in accordance with one example of the instant disclosure.

FIGS. 10A-10F depict a progression of visual indicators superimposed on geospatial image data as desired property features are added and removed from the property query data. FIG. 10A depicts polygons representing roads as property features 1002, a point visual indicator representing an airport as a property feature 1000, and a radius visual indicator 1004 associated with a distance from the airport. In FIG. 10B, additional radius visual indicators 1006 are added to represent exclusion zones around undesirable property features. For example, a potential tenant may desire to be more than five miles from any large-capacity entertainment venues such as stadiums. In FIG. 10C, perimeter visual indicators 1008 are added to represent an inclusion zone around roads 1002. For example, a prospective tenant may desire to be within a specified distance of a major highway. FIG. 10D, displays a zoomed-in view of the geospatial image data in FIG. 10C. The area of FIG. 10D is shown as a rectangle 1028 in FIG. 10C. Additional point visual indicators are added in a first color to represent to locations of appropriated spaces that are available for rent 1012 and point visual indicators in a second color are added to represent to locations that are not available for rent 1010. FIG. 10E displays a zoomed-in view of the geospatial image data in FIG. 10D. The area of FIG. 10E is shown as a rectangle 1030 in FIG. 10D. The view is zoomed-in enough that all of the property features displayed are within the inclusion zone around the roads 1008 and outside the exclusion zones 1006. Accordingly, only the coloration for the inclusion zone around roads 1008 is shown. The field of view is also small enough for individual structures to be distinguishable in the geospatial image data. FIG. 10E also includes polygons in a first color 1014 representing spaces currently available for rent, polygons in a second color 1018 representing a plurality of spaces not currently available for rent, and polygons in a third color 1018 representing currently-occupied spaces which will be available for rent soon. FIG. 10F displays a zoomed-in view of the geospatial image data in FIG. 10E, with a different viewing perspective. The area of FIG. 10F is shown as a rectangle 1032 in FIG. 10E. Additional property-feature restrictions are also implemented in FIG. 10F. Specifically, a new exclusion zone 1022 is displayed and a building within the zone 1020 is changed from being represented in green to being represented in gray, indicating that it is not a viable property under the new query data. In addition, perimeter visual indicators are added in a first color 1024 and a second color 1024 to represent flood zones of differing severity. For example, the first perimeter 1024 might represent a "fifty-year flood" and the second perimeter might represent a less frequent "one-hundred-year flood."

Figure 11A:
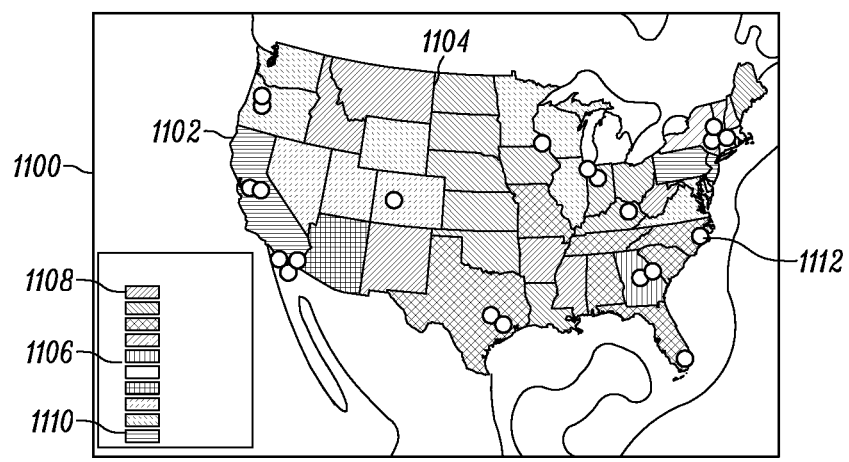
FIG. 11A is an exemplary screenshot illustrating several types of visual indicators superimposed on geospatial image data of the continental United States, in accordance with one example of the instant disclosure.
Figure 11B:
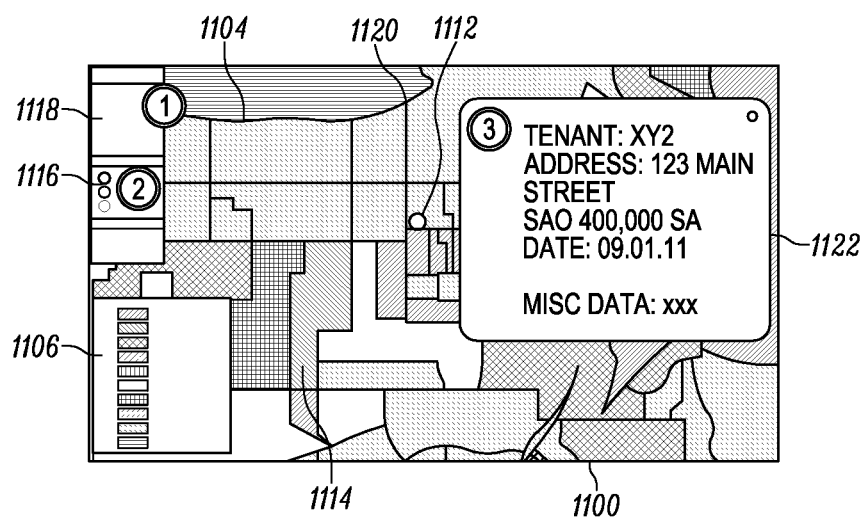
FIG. 11B is an exemplary screenshot illustrating several types of visual indicators superimposed on geospatial image data in accordance with one example of the instant disclosure.

FIGS. 11A and 11B depict a different type of composite display image 1100. In FIG. 11A, the geospatial image data 1102 includes most of North America. Two types of visual indicators are shown. Perimeter visual indicators 1104 are displayed corresponding to geographical boundaries, in this case U.S. states. The perimeter visual indicators 1104 are colored according to a key 1106, wherein the colors indicate relative values of a property feature data. For example, jurisdictions with low occupancy rates may be shown in one color 1108 while jurisdictions with high occupancy rates may be shown in a second color 1110. FIG. 11A also includes point visual indicators 1112 which may depend on a variety of property features.

In FIG. 11B the colored perimeter indicators 1104 again show geographical boundaries, in this case counties in a particular state. FIG. 11B also depicts a single point visual indicator 1112. In this embodiment, the color 1116 and size 1118 of the point visual indicator represent values associated with feature of that property. The size 1118 and color 1116 are in accord with keys displayed as part of the composite display image 1100. FIG. 11B also includes a popup visual indicator 1122 displaying additional information about the selected property 1112.

Figure 12:
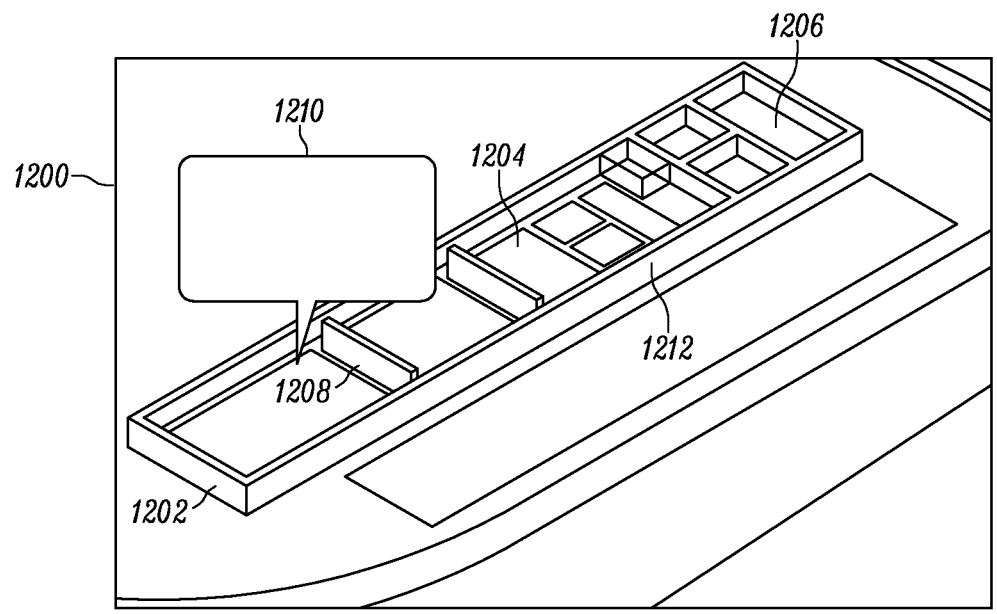
FIG. 12 is an exemplary screenshot illustrating transparent polygon visual indicators (representing walls and the floorplan foa building) and a popup visual indicator, in accordance with one example of the instant disclosure.

FIG. 12 depicts a composite display image 1200 including visual indicators representing a structure 1202. The visual indicators include thin polyhedrons representing three-dimensional interior walls 1208 and exterior 1212 walls and polygons representing available floor space 1204 and unavailable floor space 1206. The image also includes a popup visual indicator 1220 with textual information about one of the available spaces 1204.

Figure 13:
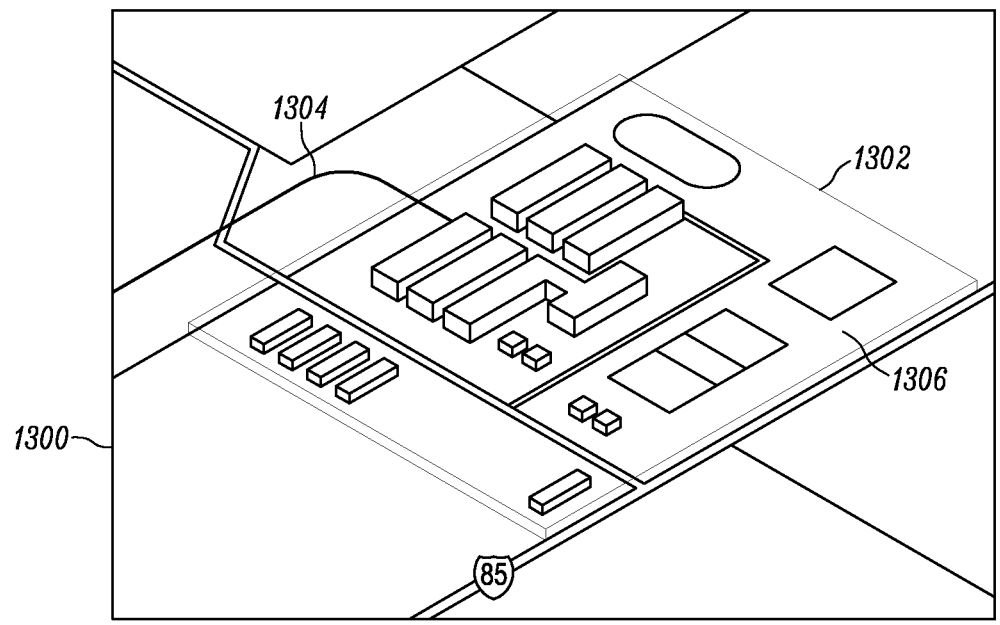
FIG. 13 is an exemplary screenshot illustrating visual indicators representing a railroad, a parking lot, roads, and the property boundary, in accordance with one example of the instant disclosure.

FIG. 13 depicts a composite display image 1300 including additional visual indicators not associated with building or structures. These additional visual indicators represent railroad tracks 1304, property boundaries 1302, and a parking lot 1306.

Figure 14:
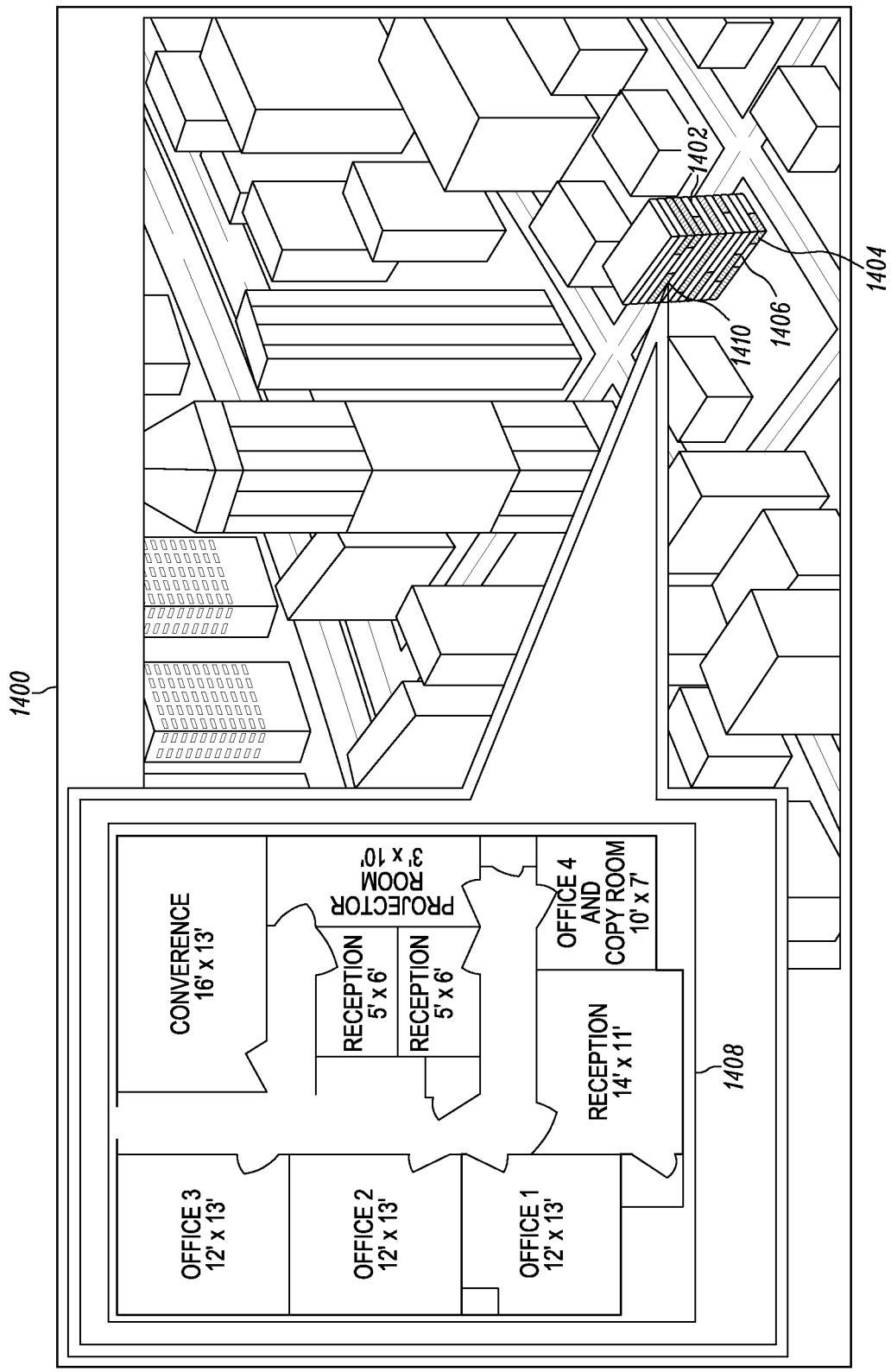
FIG. 14 is an exemplary screenshot illustrating polygon visual indicators representing suites in multi-floor commercial building, and a popup floorplan visual indicator, in accordance with one example of the instant disclosure.

FIG. 14 depicts a composite display image 1400 including a type of visual indicator which displays polygons representing available suites 1404 and unavailable suites 1406 on a floor-by-floor basis in a multi-story commercial building 1402. A second type of visual indicator in FIG. 14 includes a popup indicator 1408 which represents the floorplan of a selected suite 1410 in the building 1402.

Figure 15B:
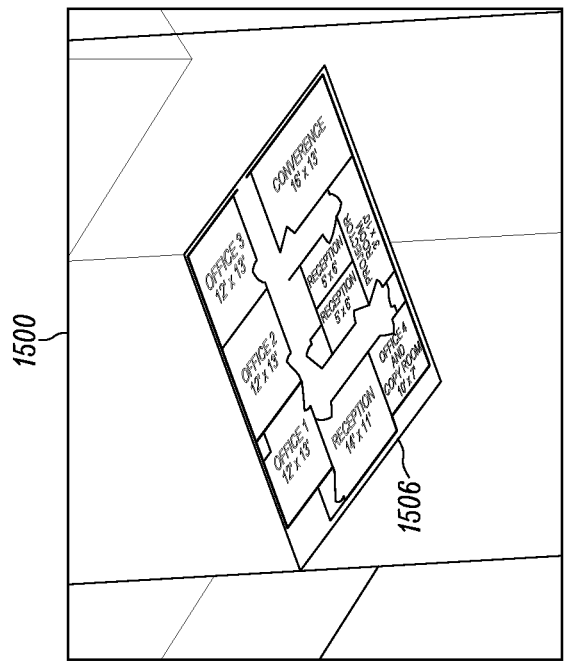
FIG. 15B is an exemplary screenshot illustrating transparent polygon visual indicators representing the walls the building and opaque polygon visual indicators representing the floorplan of one suite, in accordance with one example of the instant disclosure.
Figure 15A:
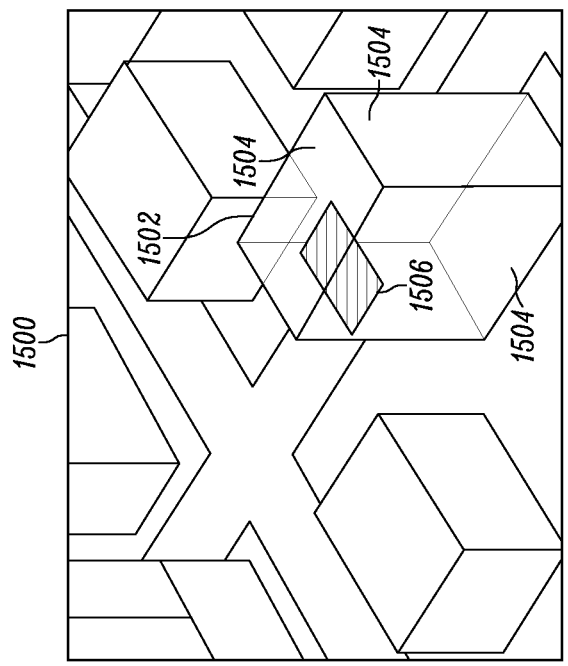
FIG. 15A is an exemplary screenshot illustrating transparent polygon visual indicators, in accordance with one example of the instant disclosure.

FIGS. 15A and 15B depict composite display images 1500 alternate visual indicators for the same building 1402. In FIG. 15A the polygons representing exterior facets of the building 1504 are partially transparent, allowing building behind it to be seen. The transparent facets 1504 also allow a polygon representing the footprint of a highlighted suite 1506 to be seen. In FIG. 15B, closer inspection of the highlighted suite shows its actual floor plan in the same viewing perspective as the building, as opposed to the overhead floor plan in the popup visual indicator 1408 in FIG. 14.

Figure 16:
FIG. 16 is an exemplary screenshot illustrating point visual indicators, radius visual indicators associated with the point visual indicators, and a heat-map visual indicator in accordance with one example of the instant disclosure.

FIG. 16 includes radius visual indicators 1606 surrounding point visual indicators 1604. It also includes a key 1608 for interpreting the meaning of multiple point and radius visual indicators. FIG. 16 also includes another type of visual indicator, a "heat map" where the color and intensity of a color gradually changes across the composite display image 1602 corresponding to an increasing or decreasing property feature of interest.

The following examples illustrate specific uses for the functionality described in this disclosure:

Development Sites

In one exemplary embodiment, the disclosure may be used to identify and visualize potential real estate development sites. In this embodiment, sites may be located during the query by searching for properties for sale with a certain size, price, and location. After potential properties are located, the sites may be outlined with a polygon. Additional polygons may represent additional proposed property features, such as buildings, parking lots, etc. Finally, a point visual indicator may be added to identify the location.

Lease Comps

In another exemplary embodiment, the disclosure may be used to compare similar leased properties. A query may search for rental properties within a range similar to a primary property. For example, if a client is considering moving, a user may search for nearby properties with similar rents and available space. The system may then produces a plurality of point visual indicators, with each point representing one rental property. Clicking on one of the point visual indicators may generate a popup visual indicator with additional details about that property. Similarly, zooming in on a small portion of the composite image may cause the point visual indicators to transition to polygons representing the rental spaces.

Tenants in the Market

In another exemplary embodiment, the system may be used to visualize a client's multiple locations in a given area. In this embodiment, a user may search for all of the client's locations within a particular postal code. Depending on the distance between the locations, the system may return a composite image with point indicators or polygon indicators for each client location. Each client location may be further indicated by a popup indicator with the client's logo.

Large Blocks

In another exemplary embodiment, the system may be used to visualize large blocks of available space in an area. In this embodiment, the query may search for all available spaces over a certain size within a certain area. The system may return a composite image overlaying polygons on buildings with available rental spaces meeting the criteria. In this example, the available suites in each building may be represented in polygons a first color and the remaining spaces in the building may be represented by polygons in a second color.

Deals Completed

In another exemplary embodiment, the system may be used to visualize recent leasing activity in an area. A query may search for rental agreements finalized in a particular timer period and area. The system may then produces a plurality of point visual indicators, with each point representing one rental property. This embodiment may be used in several iterations to visualize the changing pace of transactions in an area. Alternately, this embodiment may be used to visualize relative market position of several real estate agencies within the same market.

Submarket Statistics

In another exemplary embodiment, the system may be used to visualize submarkets within a region. In this embodiment, each submarket area in the region may be indicated by a color-coded perimeter visual indicator. The color may be determined based, for example, on rental rates, rental inventory, vacancy rates, etc. Clicking on a particular submarket region may further generate a popup visual indicator with additional details about that submarket or sub-submarkets within it.

The design and functionality described in this application is intended to be exemplary in nature and is not intended to limit the instant disclosure in any way. Those having ordinary skill in the art will appreciate that the teachings of the disclosure may be implemented in a variety of suitable forms, including those forms disclosed herein and additional forms known to those having ordinary skill in the art. For example, one skilled in the art will recognize that executable instructions may be stored on a non-transient, computer-readable storage medium, such that when executed by one or more processors, causes the one or more processors to implement the method described above.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments of this technology are described above with reference to block and flow diagrams of computing devices and methods and/or computer program products according to example embodiments of the disclosure. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the disclosure.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments of this disclosure may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A computer-implemented method for visualizing real-estate markets, the method comprising:
   obtaining, via a processor, property query data, wherein the property query data comprises data describing a request to identify one or more properties based on one or more criterion associated with the one or more properties;
   obtaining, via the processor, property data based on the one or more criterion from a real estate database, wherein the property data comprises property location data and property feature data;
   obtaining, via the processor, geospatial data associated with the one or more properties based on the one or more criterion from a geographic information system (GIS) database, wherein the geospatial data comprises geospatial coordinate data and geospatial image data;
   correlating, via the processor, the property data with the geospatial data to provide correlation data; and
   generating, via the processor, visual indicators, wherein the visual indicators are based on the correlation data and generating the visual indicators comprises:
      assigning a plurality of polygons to the geospatial coordinate data within the correlation data, wherein each polygon of the plurality of polygons represents a facet of a polyhedron representing features of one or more structures;
      assigning a degree of transparency to each polygon of the plurality of polygons based on the correlation data, wherein at least one of the polygons is at least partially transparent; and
      generating display data comprising the plurality of polygons superimposed on the geospatial image data.

2. The computer-implemented method of claim 1, wherein the one or more structures are buildings.

3. The computer-implemented method of claim 2, wherein the features of the one or more structures represented by the one or more polygons comprise
   one or more levels of the one or more structures and internal divisions of the one or more levels of one or more structures.

4. The computer-implemented method of claim 3, further comprising:
   obtaining additional query data, wherein the additional query data comprises designating a level of one of the one or more structures represented by the one or more polygons using a graphical user interface; and
   generating additional display information comprising property feature data associated with the designated level of the structure.

5. The computer-implemented method of claim 1, wherein the visual indicators further comprise one or more perimeters enclosing one or more geographic features, wherein the one or more perimeters enclose the one or more geographic features at one or more distances based on the query information.

6. The computer-implemented method of claim 5, wherein the one or more perimeters enclosing one or more geographic features comprise one or more polygons.

7. The computer-implemented method of claim 5, wherein the one or more perimeters enclosing one or more geographic features comprise one or more conic sections.

8. A computing system for visualizing real-estate markets comprising:
   a processor;
   non-transient memory operatively connected to the processor, the non-transient memory comprising instructions which when executed by the processor cause the processor to carry out a method comprising:
      obtaining property query data, wherein the property query data comprises data describing a request to identify one or more properties based on one or more criterion associated with the one or more properties;
      locating property data based on the one or more criterion from a real estate database, wherein the property data comprises property location data and property feature data; and locating geospatial data associated with the one or more properties based on the one or more criterion from a geographic information system (GIS) database, wherein the geospatial data comprises geospatial coordinate data and geospatial image data;

correlating the property data with the geospatial data to provide correlation data; and generating visual indicators, wherein the visual indicators are based on the correlation data and generating the visual indicators comprises:

assigning a plurality of polygons to the geospatial coordinate data within the correlation data, wherein each polygon of the plurality of polygons represents a facet of a polyhedron representing features of one or more structures;

assigning a degree of transparency to each polygon of the plurality of polygons based on the correlation data, wherein at least one of the polygons is at least partially transparent; and generating display data comprising the plurality of polygons superimposed on the geospatial image data.

9. The system of claim 8, wherein the one or more structures are buildings.

10. The system of claim 9, wherein the features of the one or more structures represented by the one or more polygons comprise one or more levels of the one or more structures and internal divisions of the one or more levels of one or more structures.

11. The system of claim 10, wherein the method further comprises:

obtaining additional query data, wherein the additional query data comprises designating a level of one of the one or more structures represented by the one or more polygons using a graphical user interface; and generating additional display information comprising property feature data associated with the designated level of the structure.

12. The system of claim 8, wherein the visual indicators further comprise one or more perimeters enclosing one or more geographic features, wherein the one or more perimeters enclose the one or more geographic features at one or more distances based on the query information.

13. The system of claim 12, wherein the one or more perimeters enclosing one or more geographic features comprise one or more polygons.

14. The system of claim 12, wherein the one or more perimeters enclosing one or more geographic features comprise one or more conic sections.

15. A non-transitory computer-readable medium comprising executable instructions that when executed by one or more processing units cause the one or more processing units to carry out a method comprising:

obtaining property query data, wherein the property query data comprises data describing a request to identify one or more properties based on one or more criterion associated with the one or more properties;

obtaining property data based on the one or more criterion from a real estate database, wherein the property data comprises property location data and property feature data;

obtaining geospatial data associated with the one or more properties based on the one or more criterion from a geographic information system (GIS) database, wherein the geospatial data comprises geospatial coordinate data and geospatial image data;

correlating the property data with the geospatial data to provide correlation data; and generating visual indicators, wherein the visual indicators are based on the correlation data and generating the visual indicators comprises:

assigning a plurality of polygons to the geospatial coordinate data within the correlation data, wherein each polygon of the plurality of polygons represents a facet of a polyhedron representing features of one or more structures;

assigning a degree of transparency to each polygon of the plurality of polygons based on the correlation data, wherein at least one of the polygons is at least partially transparent; and generating display data comprising the plurality of polygons superimposed on the geospatial image data.

16. The non-transitory computer-readable memory of claim 15, wherein the one or more structures are buildings.

17. The non-transitory computer-readable memory of claim 16, wherein the features of the one or more structures represented by the one or more polygons comprise one or more levels of the one or more structures and internal divisions of the one or more levels of one or more structures.

18. The computer-implemented method of claim 17, further comprising:

obtaining additional query data, wherein the additional query data comprises designating a level of one of the one or more structures represented by the one or more polygons using a graphical user interface; and generating additional display information comprising property feature data associated with the designated level of the structure.

* * * * *